United States Patent

[11] 3,620,729

| [72] | Inventors | Dilip K. Ray-Chaudhuri<br>Somerset;<br>Paul C. Georgoudis, Dunellen; Stanley<br>Field, Piscataway, all of N.J. |
|---|---|---|
| [21] | Appl. No. | 853,959 |
| [22] | Filed | Aug. 28, 1969 |
| [45] | Patented | Nov. 16, 1971 |
| [73] | Assignee | National Starch and Chemical Corporation<br>New York, N.Y. |

[54] ELECTROPHOTOGRAPHIC COATING COMPOSITIONS EMPLOYING STYRENE TERPOLYMERS AS BINDERS
10 Claims, No Drawings

[52] U.S. Cl. .......................................... 96/1.8,
 96/1 PC, 96/1.5, 260/78.5 HC, 260/80.73, 260/80.75,
 260/80.8
[51] Int. Cl. ......................................... G03g 5/08
[50] Field of Search ............................................ 96/1, 1.5,
 1.8; 252/501; 260/78.5 HC, 80.73, 80.75, 80.8

[56] References Cited
UNITED STATES PATENTS

| 3,540,886 | 11/1970 | Ansel et al. .................. | 96/1.8 |
|---|---|---|---|
| 3,554,747 | 1/1971 | Dastoor ....................... | 96/1.8 |
| 3,563,736 | 2/1971 | Koehler et al. ............... | 96/1.8 |
| 2,331,263 | 10/1943 | Britton et al. ................ | 260/78.5 HC |
| 2,537,016 | 1/1951 | Barrett ......................... | 260/78.5 HC |
| 2,781,333 | 2/1957 | Updegraff ..................... | 260/78.5 HC |
| 3,245,786 | 4/1966 | Cassiers et al. ............... | 96/1.8 |
| 3,401,037 | 9/1968 | Roteman et al. .............. | 96/1 |
| 3,481,735 | 12/1969 | Graver et al. ................. | 96/1.5 |
| 3,486,889 | 12/1969 | Bobalek et al. ............... | 96/1.8 |
| 3,515,550 | 6/1970 | Heidecker et al. ............ | 96/1.8 |

*Primary Examiner*—Charles E. Van Horn
*Attorney*—James and Franklin

ABSTRACT: Photoconductive coating compositions for application to solid substrates which are to be utilized in electrophotographic operations are described; the resultant photoconductive coatings comprise a layer of photoconductive pigment particles bonded to themselves and to the solid substrate with a styrene terpolymer.

ELECTROPHOTOGRAPHIC COATING COMPOSITIONS EMPLOYING STYRENE TERPOLYMERS AS BINDERS

This invention relates to new photoconductive coating compositions. More particularly, the invention relates to photoconductive coating compositions employing certain styrene terpolymers as binders and to the improved photoconductive coating obtained therefrom.

BACKGROUND OF THE INVENTION

In the known electrophotographic processes, a solid substrate which has been coated with a photoconductive surface is electrostatically charged in the absence of light. The charged surface is then exposed to a light source, such as an image reflected from a printed surface or transmitted through a transparency, which serves to discharge the exposed area while having no effect upon the charge on the unexposed areas which is thus retained in the form of an electrostatic image. The surface areas are then contacted with an electrostatically charged marking powder or dispersion which clings to the charged areas but does not adhere to the uncharged, i.e. exposed, areas. The visible image which is thus formed may then be transferred to another surface resulting in a positive or negative print, or, if desired, it may be fused in order to fix the image directly to the solid substrate itself.

It is evident that the proper selection of a photoconductive system is essential for a successful electrophotographic operation. Among the properties that must be exhibited by such photoconductive materials are included: the ability to accept an electrostatic charge; the ability to hold the charge for a period of time in the absence of light without exhibiting a rapid rate of charge decay; the ability to provide the fixed or developed sheets with excellent print density; the ability to provide an efficient dispersing medium for the pigment particles; inertness of the binder toward the pigment which is being utilized; and, the ability to be readily coated on a solid substrate.

A frequently utilized photoconductive system comprises the combination of a zinc oxide pigment and a polyvinyl acetate binder. This system, however, does not exhibit the aforementioned properties to an optimum level.

It is, thus, the object of this invention to provide a photoconductive system which has the ability to accept and retain an electrostatic charge for a period of time which is sufficient to permit visible development and fixation of an electrostatically formed image and which is, therefore, readily applicable for use in electrophotographic operations. It is a further object to prepare baseplates for use in electrophotographic operations by coating the latter photoconductive system onto applicable solid substrates. Various other objects and advantages of this invention will be apparent from the following description thereto.

It is recognized in the art that the properties of an electrophotoconductive system are realized not only from the particular photoconductive pigment which is utilized; rather, it is the combination of the pigment with a particular binding agent which is the critical factor. It can be understood, therefore, that the choice of a binding agent in connection with a pigment, such as zinc oxide, is of prime importance in achieving the desired characteristics of the system.

We have now found that photoconductive coatings comprising a photoconductive pigment, such as zinc oxide, bonded with a binding agent based on certain random styrene terpolymers realize the above-described requirements for achieving an effective electrophotoconductive system having desirable characteristics. A particular feature of the present electrophotoconductive compositions is their ability to discharge their electrostatic charge almost instantaneously in the presence of light. Thus, we have found that solid substrates which have been coated with the latter material will accept and hold an electrostatic charge in the absence of light, and upon being exposed to light will immediately release the charge from the exposed areas but will retain the charge on the unexposed areas with a high degree of efficiency and for a period of time sufficient to permit visible development of the electrostatic image formed by the unexposed areas. Furthermore, these photoconductive systems are readily coated onto a variety of solid substrates and provide the resulting printed sheet with excellent density, i.e. with excellent definition of the visible image.

TECHNICAL DISCLOSURE OF THE INVENTION

The polymeric binder system which is utilized in conjunction with the photoconductive pigment serves to bind the particles of the latter pigment to themselves as well as to the selected substrate. It thereby places these pigment particles in a spatial relationship with one another such that they are rendered photoconductive in those areas in which light radiation strikes the coating.

As noted above, the novel binders for the photoconductive coating compositions of this invention comprise certain styrene terpolymers. These terpolymers are used in the form of lacquers, i.e. as organic solvent solutions. The composition of these random styrene terpolymers comprises (A) at least one styrene monomer selected from the group consisting of styrene, alphamethyl styrene and chlorostyrene; (B) at least one monomer selected from the group consisting of the $C_1$–$C_{18}$ alkyl, the $C_3$–$C_6$ cycloalkyl and the $C_1$–$C_{12}$ aralkyl esters of an ethylenically unsaturated dicarboxylic acid, wherein the specified carbon atom range of the latter aralkyl esters refers to the carbon atom content of the alkyl moiety of the aralkyl ester molecule; and, (C) at least one monomer selected from the group consisting of ethylenically unsaturated monocarboxylic acids, anhydrides of ethylenically unsaturated dicarboxylic acids, and the $C_1$–$C_8$ monoalkyl esters of ethylenically unsaturated dicarboxylic acids. The molar ratio of the above-described styrene terpolymers may be in the range of from about 1.0:0.95:0.05 to 1.0:0.05:0.50; the latter molar ratios being stated in the sequence A:B:C wherein the latter letters are those used to designate the above-given monomer groups.

Exemplary of the monomers of group "B," hereinabove, are dimethyl fumarate, diethyl fumarate, dibutyl fumarate, dioctyl fumarate, distearyl fumarate, dicyclohexyl fumarate, diisononyl fumarate, dibenzyl fumarate, dimethyl maleate, diethyl maleate, dibutyl maleate, dioctyl maleate, dicyclohexyl maleate, dimethyl citraconate and dimethyl itaconate.

Monomers illustrative of the monomers of group "C" are acrylic acid, methacrylic acid, crotonic acid, itaconic acid, citraconic acid, maleic anhydride, monomethyl maleate, monethyl maleate, monobutyl maleate, monooctyl maleate, monomethyl fumarate, monoethyl fumarate, monobutyl fumarate, monooctyl fumarate, monomethyl citraconate and monomethyl itaconate.

Preferred random styrene terpolymers for use as binders in the photoconductive coating systems of this invention include a 1.0:0.45:0.25 styrene:dioctyl fumarate:monoethyl maleate terpolymer and a 0.65:0.375:0.125 styrene:dibutyl fumarate:monoethyl maleate terpolymer; the latter proportions being given on a molar ratio basis.

All of the random styrene terpolymers used in the binder compositions described herein may be prepared by means of free-radical-initiated polymerization procedures or by other polymerization procedures well known to those skilled in the art. However, they are most conveniently prepared by means of free-radical-initiated solution polymerization techniques and they may be then used in the form of the organic solvent solutions in which they were originally prepared. Alternatively, they may be prepared as 100 percent resin solids material, as by means of a bulk or pearl polymerization procedure, and subsequently dissolved in organic solvents prior to their use as binders in our photoconductive coating compositions. Organic solvents which may be employed for the solution polymerization of these terpolymers as well as for their ultimate use in formulating our photoconductive coating compositions include benzene, toluene, xylene, cyclohexane, ethyl acetate, isopropyl acetate, methyl ethyl ketone and methyl isobutyl ketone as well as mixtures of any of the latter solvents. Typical organic solvent solutions of these terpolymers, as used in preparing our photoconductive coating compositions, should have a resin solids content of up to about 70 percent, by weight.

It is to be understood that although zinc oxide will ordinarily be utilized as the photoconductive pigment component of our novel compositions, it may, however, be replaced with various equivalents therefor, such for example, as titanium dioxide, selenium oxide, zinc sulfide, and the like. Moreover, a mixture of more than one photoconductive pigment may likewise be used.

The actual preparation of the novel photoconductive coating systems of this invention may be accomplished merely by admixing and dispersing the photoconductive pigment in an organic solvent solution of the selected terpolymer and thereafter finely grinding the resulting dispersion in any suitable equipment, such as a porcelain ball mill, Morehouse mill, Kady mill, or sand mill, to a pigment particle size of from about 4 to 6 units on the Hegman scale.

Approximately from about 2 to 12 parts, by weight, of zinc oxide solids should be present in the mixture for each part, by weight, of the random styrene terpolymer resin solids. We have found that the total solids content, i.e. the combined weight of the pigment solids and the styrene terpolymer solids, of our photoconductive coating compositions may vary from about 30 to 60 percent, by weight. Appropriate dilution, when necessary, can be made using any one or more of the organic solvents described hereinabove.

The preparation is generally completed by incorporating a sensitizer dye or dye mixture into the coating composition in a concentration ranging from about 0.02 to 0.50 percent, based on the weight of the zinc oxide. Applicable sensitizers include, for example, disodium fluorescein, Rose Bengal, bromphenol blue, methylene black, erichrome black, Eosin Y, and Acridine Orange. The addition of the latter sensitizers may, however, be obviated if the resulting photoconductive systems are to be utilized in a procedure whereby the light or energy source is itself capable of causing a conductive response in the zinc oxide photoconductive pigment.

Optional additives may be incorporated into these novel photoconductive systems in order to modify certain properties thereof. Among such additives are included: plasticizers such as dialkyl phthalates; optical brighteners such as titanium dioxide; silicones; and modifying resins such as alkyd resins.

Our novel systems may be coated onto a wide variety of solid substrates such, for example, as paper, paperboard, fabrics made from natural and synthetic fibers, metallic-coated paper, metallic foils, and synthetic resin-based films such as polyethylene terephthalate, polyethylene, polypropylene, polyvinyl chloride and cellulose acetate, the latter resin-based films having previously been rendered conductive or semiconductive. The actual application of these photoconductive systems to the selected substrate may be accomplished by the use of any technique which is capable of depositing a continuous film on the surface thereof. Thus, among the various methods of application which may be utilized, one may list wire-wound and grooved-rod applicators, as well as air knife, trailing-blade, gravure, reverse and direct roll coaters. Typical coating weights may range from about 8 to 30 pounds per 3,000 square feet of substrate.

Following their application, the photoconductive coating systems are dried by any convenient means as, for example, by the use of forced-air oven drying, infrared or radiant heat drying. Here again, such drying methods are well known and the practitioner may employ the drying means best suited to his particular needs in light of the equipment which is available.

In order to demonstrate the excellent photoconductive properties exhibited by the coating systems of this invention, the tests described hereinbelow may be used. In each instance, these tests were conducted in an environment wherein the relative humidity was at a level of 50 percent.

Charge Acceptance—The selected photoconductive coating system is applied onto a paper substrate in a coating weight of 18 pounds per 3,000 square feet of paper and then dried. Thereafter, the coated paper is conditioned, in the absence of light, for a period of 24 hours whereupon it is exposed, while still in the dark, to an electrostatic charging unit for a period of 7 seconds. The surface charge which is thus imparted to the coated paper is then measured by means of an electrostatic probe.

Dark Decay Rate—Continuing the procedure of the "Charge Acceptance" test, immediately after removing the charging unit and measuring the deposited surface charge, the electrostatic probe is utilized to measure the rate at which the charge dissipates from the surface of the coated paper by measuring the surface charge for a period of 10 seconds. Needless to say, photoconductive systems which exhibit a low dark decay rate, i.e. in the range of about 2 to 8 volts/second, are preferred for use in electrophotographic operations.

Light Decay Rate—On completing the "Dark Decay Rate" the electrostatic probe is utilized to measure the rate at which the charge dissipates from the surface of the coated paper when it is exposed to a light having an intensity of 16 foot-candles. The rapidly decreasing voltage is mechanically recorded on a revolving drum recorder the speed of which is held constant for a series of samples. The light decay rate is expressed in terms of the angle at the abscissa which is obtained when the light decay rate, as expressed in terms of the voltage, is plotted against time where time is plotted along the abscissa and voltage is plotted along the ordinate. Thus, a sample which had an instantaneous discharge would, of course, display a 90° angle. Inasmuch as the speed of the recording drum itself affects the plot of the discharge curve and thereby the angle obtained with respect to time, the "Light Decay Rate" of a particular sample is a value which is relative to a control sample which is run under identical conditions.

The following examples will more fully illustrate the embodiment of this invention. In these examples all parts given are by weight unless otherwise noted.

EXAMPLE I

This example illustrates the preparation of a typical random styrene terpolymer suitable for use as a binder in the photoconductive coating compositions of this invention.

A vessel equipped with means for mechanical agitation, thermometer, nitrogen sparger, addition funnel and condenser was charged with 208 parts of styrene, 306 parts of dioctyl fumarate, 72 parts of monoethyl maleate, 100 parts of toluene and 5.9 parts of benzoyl peroxide acting as a catalyst. Under agitation, the mixture was slowly heated to 95° C. over a 1-hour period and thereafter allowed to reflux at 90°–96° C. for an additional 1-hour period. Thereafter a total of 11.8 parts of benzoyl peroxide which had been dissolved in 150 parts of toluene was added in 4 equal portions at 1-hour intervals whereupon the reaction was allowed to proceed for 2 additional hours while maintaining the temperature within the specified range of 90°–96° C. The resulting terpolymer was obtained at a conversion rate of 97 percent and displayed an intrinsic viscosity of 0.124 in toluene at 30° C.

EXAMPLE II

This example illustrates the preparation of a typical photoconductive coating system of this invention as well as the excellent properties resulting from the use thereof on a solid substrate.

Thus, 10.3 parts of a toluene solution containing 48.5 percent by weight, of a molar ratio basis of a 1.0:0.45:0.50 styrene:dioctyl fumarate:monoethyl maleate random terpolymer, prepared as described in example I hereinabove, was admixed with 49.7 parts of toluene and 40.0 parts of a finely divided, photoconductive zinc oxide. The resulting suspension was subjected to grinding in a porcelain ball mill for a period of about 3 hours so as to reduce the particle size of the mixture to within the range of from 4.5 to 5.5 on the Hegman scale. Thereafter, 0.9 part, by weight, of a dye sensitizer mixture comprising 1.0 percent, by weight, of disodium fluorescein, 1.0 percent, by weight, of bromphenol blue and 1.0 percent, by weight of erichrome black dissolved in methanol were intimately dispersed in the mix.

The resulting photoconductive coating system, which had a total solids content of 45 percent, by weight, was then subjected to the "Charge Acceptance" and "Dark Decay Rate" tests, as described hereinabove, wherein it exhibited a charge acceptance of 370 volts and a dark decay rate of 4 volts/second.

These results clearly indicate that this photoconductive coating system had the capability of accepting a substantial surface charge and of retaining the thus-accepted charge for a period of time sufficient to fix an image created thereon.

In a repetition of the preparative procedure described in example I, hereinabove, dibutyl fumarate was substituted for the dioctyl fumarate and monobutyl maleate was substituted for the monoethyl maleate of the above-described styrene terpolymer. The thus-prepared random terpolymer was utilized as the binder in the above-described coating composition and the resulting coating exhibited test results fully comparable to those obtained with the coating system containing the original random styrene terpolymer binder.

EXAMPLE III

This example illustrates the preparation of additional random styrene terpolymers and their use, as binders, in the photoconductive coating systems typical of the novel compositions of this invention.

The following monomer mixtures were utilized in preparing a number of different styrene terpolymers by means of the solution polymerization procedure described in example I hereinabove.

| Terpolymer | Composition of Monomer Mixture |
| --- | --- |
| A | 406 parts styrene, 516 parts dibutyl 108 parts monoethyl maleate |
| B | 338 parts styrene, 428 parts dibutyl fumarate and 90 parts monoethyl maleate |
| C | 416 parts styrene, 612 parts dioctyl fumarate and 144 parts monoethyl maleate |
| D | 405 parts styrene, 393 parts diethyl fumarate and 104 parts monoethyl maleate |
| E | 270 parts styrene, 400 parts dibutyl fumarate and 64.6 parts acrylic acid |
| Control | 65 parts vinyl acetate, 25 parts dibutyl maleate and 10 parts crotonic acid |

Each of the resulting styrene terpolymers as well as the control terpolymer was utilized as a binder in a photoconductive coating composition at a pigment-to-resin-solids ratio as indicated in the following table which also summarizes the results obtained upon subjecting the resulting compositions to the "Charge Acceptance," "Dark Decay Rate" and "Light Decay Rate" test procedures described hereinabove.

TABLE I

| Terpolymer | Pigment/ Resin Solids | Charge Accept. | Dark Decay Rate | Light Decay Rate |
| --- | --- | --- | --- | --- |
| A | 8/1 | 390 volts | 5 volts/sec. | 85° |
| B | 8/1 | 300 volts | 8 volts/sec. | 80° |
| C | 8/1 | 350 volts | 5 volts/sec. | 85° |
| D | 6/1 | 430 volts | 5 volts/sec. | 85° |
| E | 8/1 | 350 volts | 7 volts/sec. | 85° |
| Control | 8/1 | 325 volts | 6 volts/sec. | 60° |

The above data reveal that coating compositions based upon the styrene containing terpolymers possessed excellent photoconductive properties as shown by their high charge acceptance values, their low dark decay rate values and their relatively superior light decay rate values as compared to the control whose polymeric binder was devoid of any styrene.

Summarizing, it is seen that this invention provides a novel class of random styrene-terpolymer-based electrophotoconductive binder compositions which possess excellent properties for their us in electrophotographic operations.

Variations may be made in procedures, proportions and materials without departing from the scope of this invention which is defined by the following claims.

We claim:
1. A photoconductive coating composition which comprises a blend of (1) a finely divided photoconductive pigment; and, (2) a binder therefor comprising an organic solvent solution of a random styrene terpolymer containing moieties derived from:
   A. at least one styrene monomer selected from the group consisting of styrene, alpha-methyl styrene and chlorostyrene;
   B. at least one monomer selected from the group consisting of the $C_1$–$C_{18}$ alkyl, the $C_3$–$C_6$ cycloalkyl and the $C_1$–$C_{12}$ aralkyl esters of an ethylenically unsaturated dicarboxylic acid, wherein the stated carbon atom range for said aralkyl esters refers to the carbon atom content of the alkyl moiety thereof; and,
   C. at least one monomer selected from the group consisting of the ethylenically unsaturated monocarboxylic acids, the anhydrides of ethylenically unsaturated dicarboxylic acids; and the $C_1$–$C_8$ monoalkyl esters of ethylenically unsaturated dicarboxylic acids; the molar ratio of monomers from groups A, B and C being in the range of from about 1.0:0.95:0.05 to 1.0:0.05:0.5; the particles of said photoconductive pigment being dispersed in said binder solution.

2. The coating composition of claim 1, wherein the ratio of pigment solids to binder solids ranges from about 2:1 to 12:1, by weight.

3. The coating composition of claim 1, wherein there is also present from about 0.02 to 0.5 percent of at least one sensitizer dye as based on the weight of the photoconductive pigment solids therein.

4. The coating composition of claim 1, wherein said random styrene terpolymer contains moieties derived from styrene, dioctyl fumarate and monoethyl maleate.

5. The coating composition of claim 1, wherein said photoconductive pigment is selected from the group consisting of zinc oxide, titanium dioxide, selenium oxide and zinc sulfide.

6. An assembly suitable for use in electrophotographic operations, said assembly comprising a solid substrate coated on at least one surface thereof with a photoconductive coating composition comprising a finely divided photoconductive pigment whose particles are bound to said substrate and to one another by means of the dried consolidated residue of an organic solvent solution of a random styrene terpolymer containing moieties derived from:
   A. at least one styrene monomer selected from the group consisting of styrene, alpha-methyl styrene and chlorostyrene;
   B. at least one monomer selected from the group consisting of the $C_1$–$C_{18}$ alkyl, the $C_3$–$C_6$ cycloalkyl and the $C_1$–$C_{12}$ aralkyl esters of an ethylenically unsaturated dicarboxylic acid, wherein the stated carbon atom range for said aralkyl esters refers to the carbon atom content of the alkyl moiety thereof; and,
   C. at least one monomer selected from the group consisting of the ethylenically unsaturated monocarboxylic acids, the anhydrides of ethylenically unsaturated dicarboxylic acids, and the $C_1$–$C_8$ monoalkyl esters of ethylenically unsaturated dicarboxylic acids; the molar ratio of monomers from groups A, B and C being in the range of from about 1.0:0.95:0.05 to 1.0:0.05:0.5.

7. The assembly of claim 6, wherein the ratio of pigment solids to binder solids ranges from about 2:1 to 12:1, by weight.

8. The assembly of claim 6, wherein there is also present from about 0.02 to 0.5 percent of at least one sensitizer dye as based on the weight of the photoconductive pigment solids therein.

9. The assembly of claim 6, wherein said photoconductive pigment is selected from the group consisting of zinc oxide, titanium dioxide, selenium oxide and zinc sulfide.

10. A method for producing an electrostatic image which comprises the steps of
1. electrostatically charging, in the absence of light, a solid substrate coated on at least one surface thereof with a photoconductive coating comprising a blend of a finely divided photoconductive pigment whose particles are bound to said substrate and to one another by means of the dried, consolidated residue of an organic solvent solution of a random styrene terpolymer which contains moieties derived from:
   A. at least one styrene monomer selected from the group consisting of styrene, alpha-methyl styrene and chlorostyrene;
   B. at least one monomer selected from the group consisting of the $C_1$–$C_{18}$ alkyl, the $C_3$–$C_8$ cycloalkyl and the $C_1$–$C_{12}$ aralkyl esters of an ethylenically unsaturated dicarboxylic acid, wherein the stated carbon atom range for said aralkyl esters refers to the carbon atom content of the alkyl moiety thereof; and
   C. at least one monomer selected from the group consisting of the ethylenically unsaturated monocarboxylic acids, the anhydrides of ethylenically unsaturated dicarboxylic acids, and the $C_1$–$C_8$ monoalkyl esters of ethylenically unsaturated dicarboxylic acids; the molar ratio of monomers from groups A, B and C being in the range of from about 1.0:0.95:0.05 to 1.0:0.05:0.5;
2. exposing the resulting charged surface to an image thereby discharging the surface at the points of exposure to light and retaining the unexposed, charged areas in the form of an electrostatic image; and
3. visibly developing said electrostatic image.

* * * * *

UNITED STATES PATENT OFFICE
CERTIFICATE OF CORRECTION

Patent No. 3,620,729                    Dated November 16, 1971

Inventor(s) Dilip K. Ray-Chaudhuri, et al

It is certified that error appears in the above-identified patent and that said Letters Patent are hereby corrected as shown below:

Column 5, line 41, after "dibutyl" insert -- fumarate and -- .

Signed and sealed this 14th day of November 1972.

(SEAL)
Attest:

EDWARD M. FLETCHER, JR.          ROBERT GOTTSCHALK
Attesting Officer                Commissioner of Patents